United States Patent
Gipson (10) Patent No.: US 7,857,343 B2
(45) Date of Patent: Dec. 28, 2010

(54) TRAILER WITH ADJUSTABLE GROUND CLEARANCE

(75) Inventor: Tommie Carroll Gipson, Eaton, CO (US)

(73) Assignee: RRI Holdings, Inc., Dallas, TX (US)

( * ) Notice: Subject to any disclaimer, the term of this patent is extended or adjusted under 35 U.S.C. 154(b) by 31 days.

(21) Appl. No.: 12/378,076

(22) Filed: Feb. 11, 2009

(65) Prior Publication Data

US 2010/0201101 A1    Aug. 12, 2010

(51) Int. Cl.
B60D 1/46    (2006.01)
B62D 53/06    (2006.01)

(52) U.S. Cl. .................. 280/441.2; 280/475

(58) Field of Classification Search ............. 280/491.1, 280/441.2, 417.1, 475, 490.1
See application file for complete search history.

(56) References Cited

U.S. PATENT DOCUMENTS 2,789,714 A * 4/1957 Norris .................. 414/475
3,419,169 A * 12/1968 Clayton .................... 414/481
3,883,019 A * 5/1975 Hansen, Jr. ................ 414/481
4,078,684 A * 3/1978 Hasenberg et al. .......... 414/481
4,219,211 A * 8/1980 Sauers .................... 280/441.2
4,513,987 A * 4/1985 Whitaker ................. 280/441.2
5,114,169 A * 5/1992 Botkin et al. ............ 280/423.1
5,566,964 A * 10/1996 Leonard .................. 280/417.1
2004/0084874 A1 * 5/2004 McDougall et al. ...... 280/441.2

* cited by examiner

Primary Examiner—Anne Marie M. Boehler
(74) Attorney, Agent, or Firm—Elizabeth R. Hall (57) ABSTRACT

A simple mechanical height adjustment device adjusts the ground clearance of a trailer. The trailer, having the height adjustment device can selectably and reversibly increase its ground clearance. The trailer, having an adjustable ground clearance, can minimize its load height when operating on improved roads in order to meet local and state height regulation, but can increase its ground clearance on uneven roads.

9 Claims, 6 Drawing Sheets

TRAILER WITH ADJUSTABLE GROUND CLEARANCE

BACKGROUND OF THE INVENTION

1. Field of the Invention

The present invention relates to a method and apparatus for selectably adjusting the ground clearance of a towed trailer vehicle.

2. Description of the Related Art

Whenever, a trailer transports a high load it must minimize its load height to avoid the need for special routing or for hiring an escort as may be necessitated by local or state regulations. This problem is especially acute for the long trailers used for hauling oilfield equipment such as coiled tubing rigs used for well drilling and servicing. Coiled tubing rigs normally are rather tall, and the desirability of mounting an entire rig on a single trailer leads to the use of long trailers.

Further complicating this problem is the fact that many well locations are only accessible over very rough, uneven roads. Pulling long, low trailers loaded with heavy equipment over rough, uneven roads often leads to problems in expeditiously getting the oilfield equipment to a well site. This is particularly true, if it is desired to deliver the coiled tubing rigs to the well site on a single trailer.

A need exists for a simple, inexpensive means of adjusting trailer ground clearance which is easy to use.

SUMMARY OF THE INVENTION

This invention pertains to a device for adjusting the ground clearance of a trailer. One embodiment of the present invention includes a simple mechanical means for selectably and reversibly increasing the ground clearance of a trailer so that it can operate within a safe overall height limit when operating on improved roads, but can also operate with increased ground clearance on uneven roads.

One embodiment of the present invention includes a vehicle trailer comprising: (a) a rear deck; (b) a forward deck having a second end; (c) a central deck having a front end and a rear end, wherein the rear end is attached to the rear deck; and d) a pivotable altitude adjustment mechanism connecting the front end of the central deck to the second end of the forward deck, wherein the altitude adjustment mechanism includes a plurality of selectably engageable pin connections; whereby the forward deck and the central deck have a unique angular alignment with each other for each pin connection.

A second embodiment of the present invention includes a vehicle trailer comprising: (a) a rear deck; (b) a forward deck having a first end and a second end; (c) a central deck having a front end and a rear end, wherein the rear end is attached to the rear deck; and (d) a pair of pivotable altitude adjustment mechanisms connecting the front end of the central deck to the second end of the forward deck, wherein each altitude adjustment mechanism includes (i) a pair of rear pivot plates mounted on the front end of the central deck parallel to and offset from a longitudinal midplane of the trailer, wherein each rear pivot plate has a pivot hole and a plurality of position locking pin holes, (ii) a forward pivot plate mounted on the second end of the forward deck parallel to and offset from the longitudinal midplane of the trailer, wherein the forward pivot plate has a pivot hole and a plurality of position locking pin holes, and (iii) a pivot pin connecting the pivot hole of the forward pivot plate to the pivot holes of the pair of rear pivot plates when the pivot holes of the forward pivot plate and the rear pivot plates are coaxially aligned, and (iv) a selectably engageable position locking pin connecting one of a plurality of coaxially aligned position locking pin hole sets, wherein each set of position locking pin holes includes one position locking pin hole of the forward pivot plate and one position locking pin hole in each rear pivot plate, and whereby each set of position locking pin holes is associated with a particular height of ground clearance for the front end of the central deck.

Another embodiment of the present invention includes a vehicle trailer comprising: (a) a rear deck; (b) a forward deck having a first end and a second end; (c) a central deck having a front end and a rear end, wherein the rear end is attached to the rear deck; and (d) a pair of pivotable altitude adjustment mechanisms connecting the front end of the central deck to the second end of the forward deck, wherein each altitude adjustment mechanism includes (i) a first rear pivot plate having a first pivot hole and a plurality of position locking pin holes, wherein the first rear pivot plate is mounted on the front end of the central deck parallel to and offset from the longitudinal midplane of the trailer, (ii) a second rear pivot plate having a second pivot hole and a plurality of position locking pin holes, wherein the second rear pivot plate is mounted on the front end of the central deck parallel to the first rear pivot plate and offset from the first rear pivot plate towards the longitudinal midplane of the trailer, (iii) a forward pivot plate mounted on the second end of the forward deck parallel to and offset from the longitudinal midplane of the trailer, wherein the forward pivot plate has a pivot hole and a plurality of position locking pin holes, and (iv) a pivot pin connecting the pivot hole of the forward pivot plate to the pivot holes of the pair of rear pivot plates when the forward pivot plate is positioned between the first and second rear pivot plates and the pivot holes of the rear pivot plates are coaxially aligned with the pivot hole of the forward pivot plate, and (v) a selectably engageable position locking pin connecting one of a plurality of coaxially aligned position locking pin hole sets, wherein each set of position locking pin holes includes one position locking pin hole of the forward pivot plate and one position locking pin hole in each rear pivot plate, and whereby each set of position locking pin holes is associated with a particular ground clearance for the front end of the central deck.

The foregoing has outlined rather broadly several aspects of the present invention in order that the detailed description of the invention that follows may be better understood and thus is not intended to narrow or limit in any manner the appended claims which define the invention. Additional features and advantages of the invention will be described hereinafter which form the subject of the claims of the invention. It should be appreciated by those skilled in the art that the conception and the specific embodiment disclosed may be readily utilized as a basis for modifying or designing of the structures for carrying out the same purposes as the invention. It should be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

As a note, the use of the terms "invention", "present invention" and variations thereof throughout the subject patent application (and headings therein) are intended to refer or relate to one or more embodiments of the present application, not necessarily every embodiment or claim of the application.

Referring now to the drawings, it is noted that like reference characters designate like or similar parts throughout the drawings. The figures, or drawings, are not intended to be to scale. For example, purely for the sake of greater clarity in the drawings, wall thicknesses and spacings are not dimensioned as they actually exist in the assembled embodiments.

The present invention pertains to a device for adjusting the ground clearance of a trailer. One embodiment of the present invention includes a simple mechanical means for selectably and reversibly increasing the ground clearance of a trailer so that it can operate within a safe overall height limit when operating on improved roads, but can also operate with increased ground clearance on uneven roads.

The materials of construction of the structural components of the height adjustment mechanism are typically those employed by other commercial highway vehicles. The tractor is generally a heavy duty commercially available vehicle which has a fifth wheel for towing a trailer and multiple rear axles. The tractor normally will have a steel frame and either a steel or fiberglass cab.

For hauling high loads, the trailer will preferably be a "low-boy" trailer with a depressed center section for carrying cargo at a lower height than would a standard trailer with a flat deck. The trailer normally is fabricated from steel because of the high weight and long span between its pivot pin and its multiple rear axles, although aluminum can be used for many parts in order to minimize vehicle weight. The trailer is provided with a pair of either hydraulic or mechanical jacks having foot plates for contacting the ground. The jacks are mounted at or near the forward and back ends of the depressed center section of the trailer.

Figure 1:
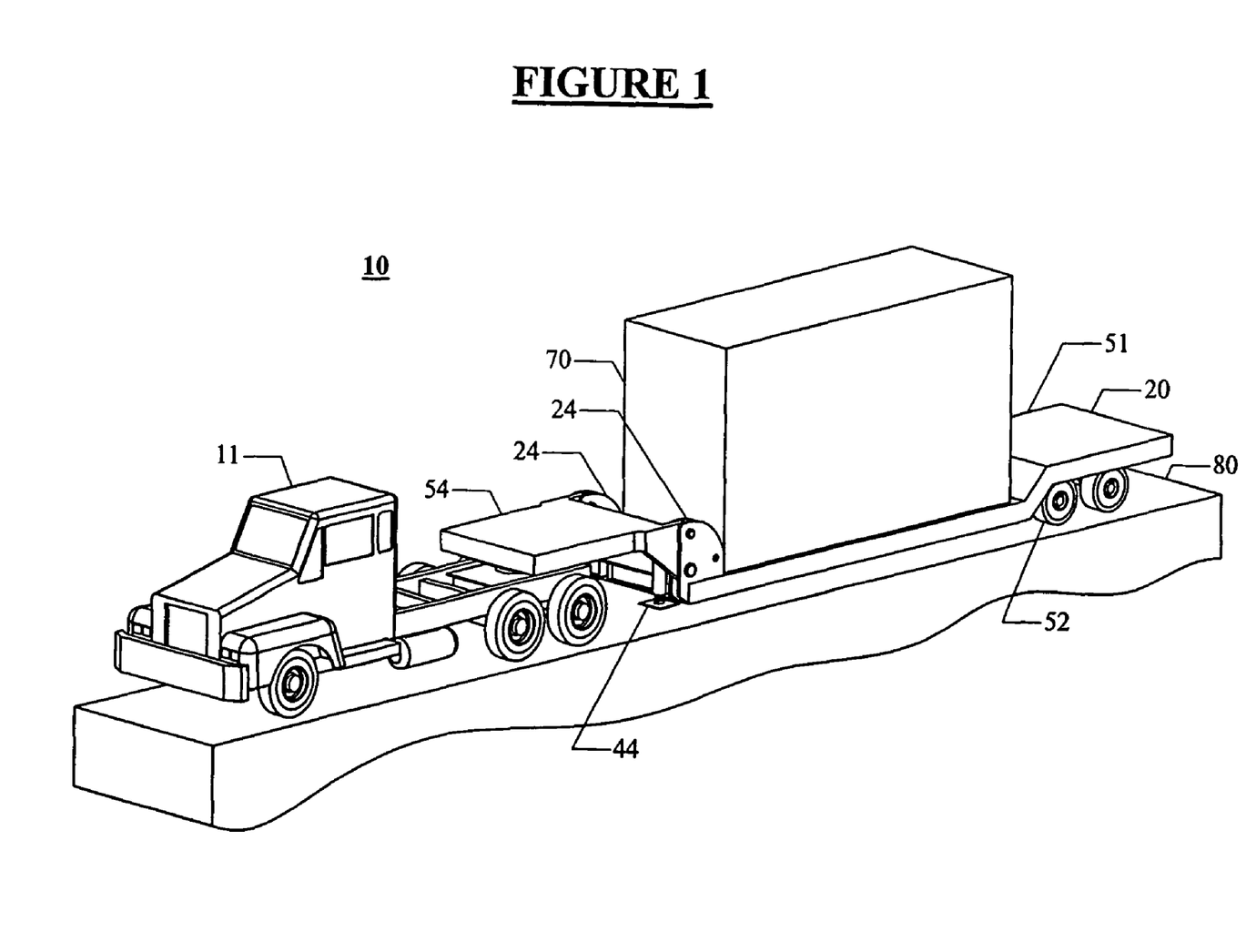
FIG. 1 is an oblique view of a tractor-trailer combination, wherein the trailer having an altitude adjustment mechanism for adjusting its ground clearance.

Referring to FIG. 1, a tractor/trailer rig 10 utilizing the low-boy trailer 20 is shown in an oblique view hauling a tall rectangular load 70. The tractor 11 is a heavy duty commercially available vehicle having a fifth wheel 12 for towing the trailer 20 and multiple driven rear axles. The load 70 is shown as a rectangular prism for simplicity, but can have a wide variety of configurations, depending upon the make-up and desired use of the load.

For example, when designing a trailer for mounting a coiled tubing rig for use in well drilling or servicing, the rig designer will normally make the reel for the tubing and the other rig components as large as possible to still be compatible with standard unpermitted vehicle height limits. This is done in order to permit using larger diameter tubing or more tubing on the reel or both.

Figure 2:
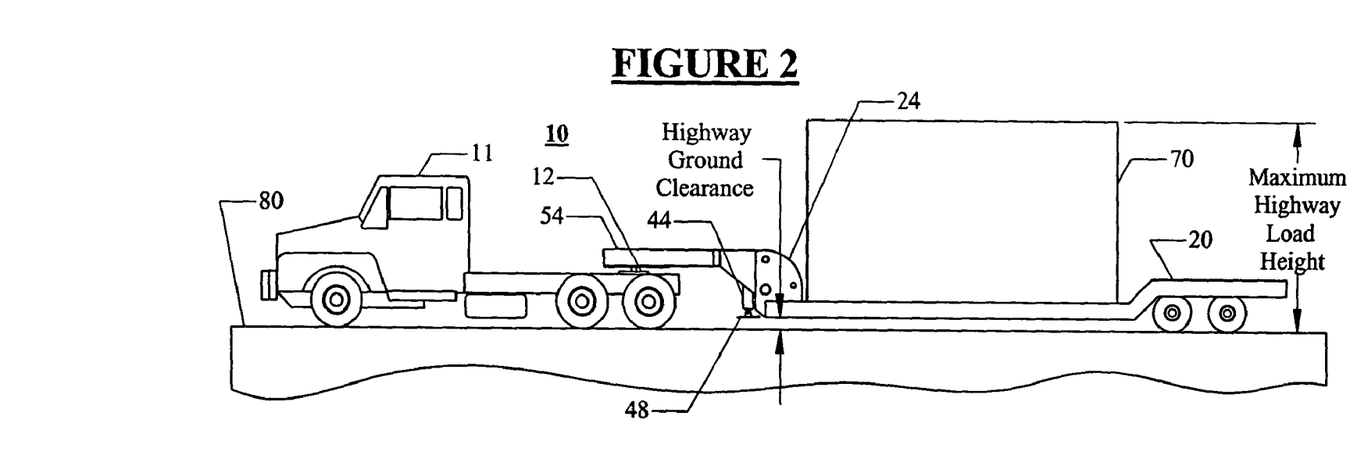
FIG. 2 is a side profile view of the tractor-trailer combination of FIG. 1, showing the trailer in its first configuration for being towed on a highway.

FIG. 2 shows a side profile view of the tractor 11 and trailer 20 of the present invention, wherein the trailer is in its lower first transit position, or highway towing position, suitable for unpermitted highway use. The highway ground clearance for the trailer of FIG. 2 is preselected by the trailer designer to be the minimum compatible with most paved roads, so that the practical load height can be maximized. However, the ground clearance of the trailer 20 as shown in FIG. 2 is insufficient for rough roads.

Referring to both FIGS. 1 and 2, the trailer 20 is seen to have a rear deck 51 which is necessarily elevated in order to provide clearance for the rear axle assemblies 52. The rear deck 51 is flat and typically has a width of approximately 8 feet, while its length is generally somewhat longer in order to accommodate multiple rear axle assemblies. The rear axle assemblies include the axles, brakes, conventional spring supported suspensions, shock absorbers, wheels, and tires common to most conventional heavy duty trailers suitable for both highway and unimproved road use. The flat upper surface of the rear deck 51 is underlain and supported by longitudinal beams with smaller transverse cross beams (not shown). When in the highway towing configuration shown in FIG. 2, the rear deck 51 is substantially parallel to the approximately planar roadway 80 supporting the tractor-trailer rig 10.

The rectangular main or central deck 21 of the low-boy trailer 20 has the same width as that of the rear deck 51 and is structurally connected to the rear deck by a short inclined deck segment which slopes downwardly in the forward direction. The central deck 21 is elongated and serves as the main load supporting area for the trailer 20. When unloaded, the central deck 21 is generally cambered upwardly in its center. However, when the central deck 21 is statically loaded with its design load cargo 70, the upper surface of the central deck is substantially planar.

Both the central deck 21 and the short inclined deck segment are connected to the rear deck 51 by continuous longitudinal beams to support the large bending loads associated with supporting the cargo on the central deck. Transverse cross beams are used to further stiffen and strengthen the deck surface of the central deck 21, similar to the rear deck 51. When in the highway towing configuration shown in FIG. 2, the main bed 21 of the trailer 20 is substantially parallel to the rear deck 51.

Figure 4:
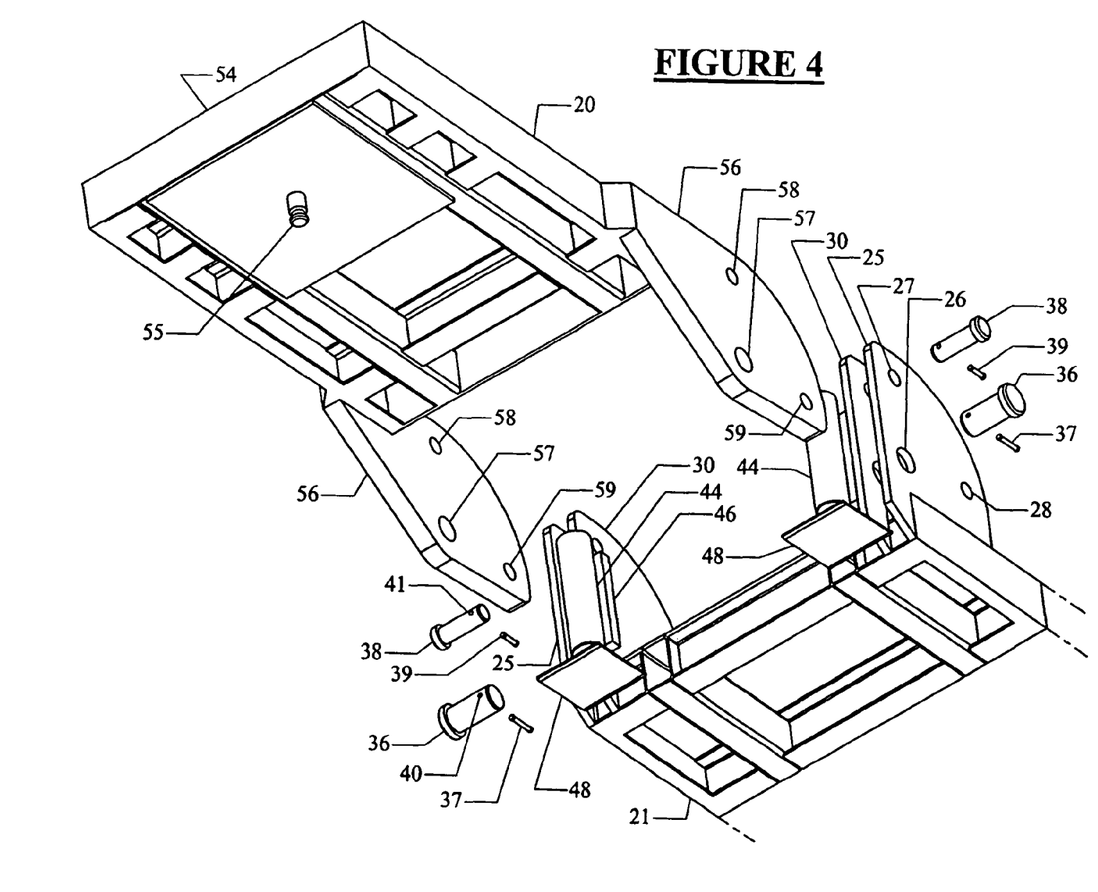
FIG. 4 is an exploded oblique view from the forward side of the underside of the forward deck of the trailer showing the components of the altitude adjustment mechanism.
Figure 5:
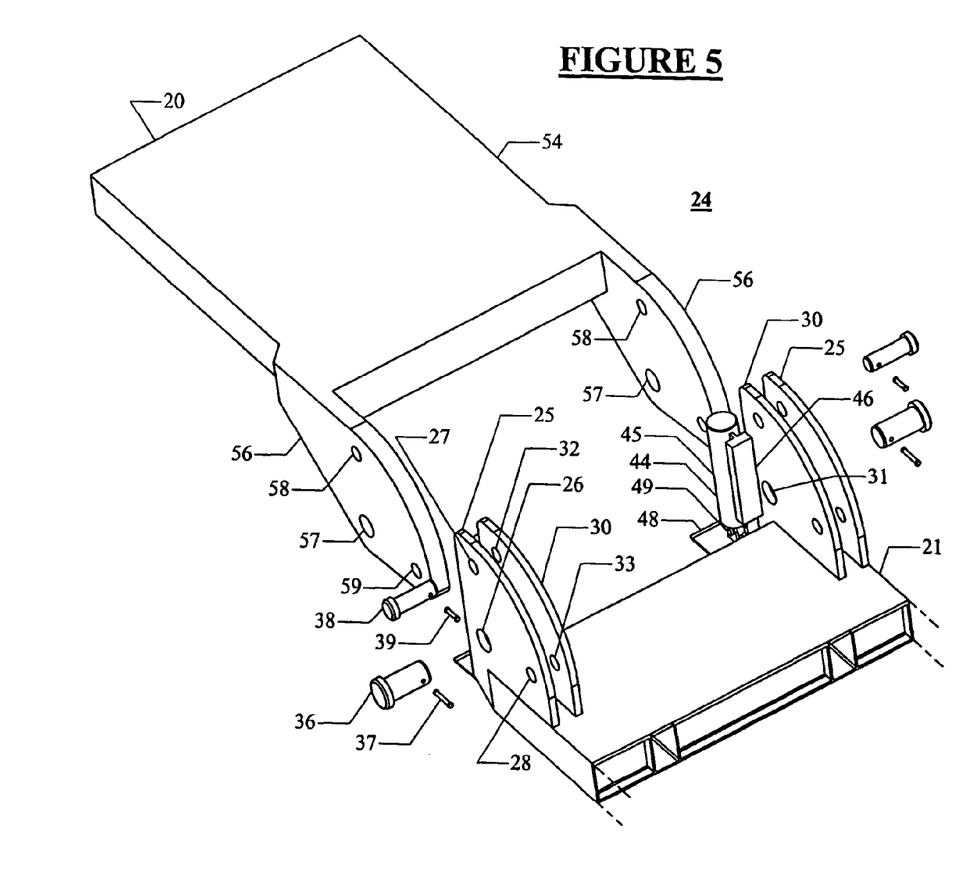
FIG. 5 is an exploded oblique view from above of the rearward side of the forward deck of the trailer showing the same components of the altitude adjustment mechanism as shown in FIG. 4.

An altitude adjustment mechanism 24 is used to join the central deck 21 to the forward deck 54 of the trailer 20. FIGS. 4 and 5 show exploded views of the altitude adjustment mechanism 24. A pair of altitude adjustment mechanisms 24 are utilized to selectably adjust the ground clearance of the front end of the central deck 21 of the trailer, with one altitude adjustment mechanism 24 mounted on each side of the trailer 20. The two altitude adjustment mechanisms 24 are symmetrical mounted about the longitudinal midplane of the trailer 20.

Each altitude adjustment mechanism 24 includes three principle components. One pair of elements (the rear pivot plates 25 and 30) of the altitude adjustment mechanism 24 is attached to the forward end of the central deck 21, while the other element (the forward pivot plate) of the mechanism 24 is attached to the rear side of the forward deck 54 of the trailer 20.

The two elements of each altitude adjustment mechanism 24 mounted on the forward end of the central deck 21 of the trailer 20 are a pair of substantially similar rear pivot plates 25 and 30. The outboard or outer pivot plate 25 is mounted vertically with its outer side flush with the side of the main bed of the central deck 21. The inboard or inner pivot plate 30 of each rear pivot plate pair is mounted vertically and aligned parallel to the outboard pivot plate 25. Each inboard pivot plate 30 is spaced apart from its adjacent outboard pivot plate 25 in the direction towards the trailer longitudinal midplane.

Figure 8:
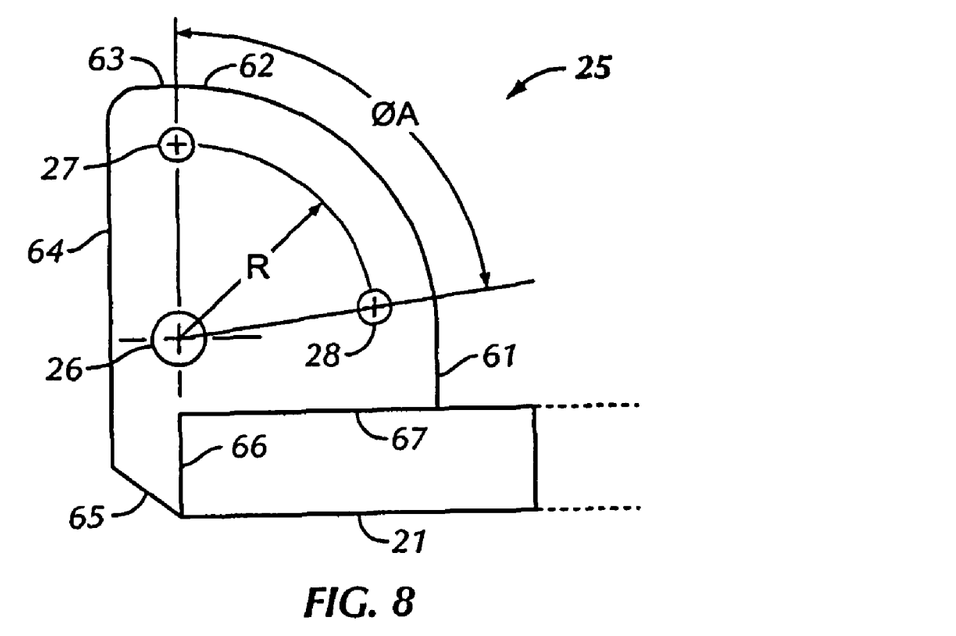
FIG. 8 is a detail side view of the outer rear pivot plate, wherein the angular relationships of the position locking pin holes are indicated.

Referring to FIG. 8, it can be seen that each rear outboard pivot plate 25, and similarly each rear inboard pivot plate 30, consists of an approximately 90° arcuate sector of a circle with a projecting tab on its lower horizontal straight side. Going counterclockwise from its righthand lower side as seen in FIGS. 5 and 8, the perimeter of each pivot plate 25 and 30 has a short first vertical edge 61, a 90° arcuate edge 62 curving upwardly and to the left, a short first horizontal edge 63, and a long vertical edge 64. The short first horizontal edge 63 and the long vertical edge 64 are joined by a small radius arc.

Adjoining the long vertical edge 64 on its lower end is a short edge 65 inclined at approximately 45° from the vertical to slope downwardly toward the front portion of the central deck 21 to which the outboard pivot plate 25 is attached. Adjoining the inclined edge 65 is a second vertical edge 66 having a length equal to the vertical thickness of the central deck 21. A long horizontal edge 67 extends from the second vertical edge 66 to the lower end of the first vertical edge 61.

The center of the 90° arc edge 62 lies in the plane of the second vertical edge 66. Each of the rear outboard 25 and inner 30 pivot plates is attached by welding to both the forward deck and the upper surface of the central deck 21 of the trailer 20. The rear pivot plates 25 and 30 are strongly and rigidly connected to the structure underneath the upper load bearing surface of the central deck 21 of the trailer 20. In particular, loadings are efficiently transferred between the rear pivot plates 25 and 30 and the longitudinal beams supporting the main bed of the central deck 21 of the trailer.

A large diameter pivot pin through hole 26 is aligned with the axis of the arcuate edge 62 of the outer pivot plates 25. A corresponding large diameter pivot pin through hole 31 is aligned with the axis of the arcuate edge 62 of the inner pivot plates 30 and is coaxial with the through hole 26 of the outer pivot plate 25.

For the rear outer pivot plates 25, a first position locking pin hole 27 is located vertically at radius R above the pivot pin hole 26. A second position locking pin hole 28 is located, clockwise from hole 27 by angle ΦA, at radius R from the pivot pin hole 26. The first position locking pin hole 27 and second position locking pin hole 28 have substantially the same diameter, which is smaller than that of the pivot pin hole 26. The pivot pin hole 26 and the position locking pin holes 27 and 28 are mutually parallel and normal to the longitudinal midplane of the trailer 20.

For the rear inner pivot plates 30, a first position locking pin hole 32 is located vertically at radius R above the pivot pin hole 31, and a second position locking pin hole 33 is located at radius R from the pivot pin hole 31 clockwise from hole 32 by angle ΦA. The first 32 and second 33 position locking pin holes have the same diameter which is smaller than that of the pivot pin holes 31. The pivot pin hole 31 and the position locking pin holes 32 and 33 are mutually parallel and normal to the longitudinal midplane of the trailer 20. In addition, the first position locking pin hole 27 and the second position locking pin hole 28 of the outboard pivot plate 25 are coaxial with the corresponding first position locking pin hole 32 and the second position locking pin hole 33 of the inner pivot plates 30.

A pair of hydraulic jacks 44 is located at the forward end of the central deck 21 of the trailer 20. The jacks 44 typically utilize conventional hydraulic double acting single end cylinders with the cylinders oriented perpendicular to the flat deck of the central deck 21 of the trailer 20. The selectably reciprocable rods of the jacks 44 extend downwardly. The jacks 44 are similar to each other and generally consist of a conventional hollow right circular cylindrical body of revolution 45 having a main bore diameter, a blind end at an upper end, and a reduced bore diameter gland at the lower end.

Each jack body 45 has a radially outwardly extending cylinder mounting bracket 46 on one side. A right circular cylindrical jack cylinder rod 47 having an upset transverse cylindrical piston head at its upper end and a male threaded distal portion at its lower end is deployed in the cylinder body 45. The piston head and the rod shank respectively seal to the main bore and the gland of the cylinder body. A foot plate assembly 48 having from its upper end a female socket threadedly engaged with the male thread of the rod 47, a pivoting hinge with a foot plate pivot pin 49, and a rectangular transverse foot plate is located at the bottom of each jack 44. The axis of the foot plate pivot pin 49 is horizontal and is perpendicular to the longitudinal midplane of the trailer 20.

Each jack 44 is attached to a rear inner pivot plate 30 in its vertical position inboard of and extending forward of the forward vertical edge of the inner pivot plate 30. The positioning of the jacks 44 is such that their foot plates will not interfere with the forward deck of the central deck 21 of the trailer 20 when the foot plates 48 of the jacks are raised or lowered.

The forward deck 54 of the trailer 20 is a short flat section which is somewhat narrower than the rest of the trailer. The forward deck 54 of the trailer has a conventional kingpin extending downwardly on the underside of the forward deck. The kingpin 55 attachment is transverse to the upper surface of the forward deck and is located on the longitudinal midplane of the trailer 20 near the forward deck of the forward deck. The kingpin 55 is configured to be selectably latched and unlatched from the fifth wheel 12 of the tractor 11 so that the trailer 20 can be towed readily. The nature of the kingpin 55 to fifth wheel 12 attachment is such that it can tolerate a reasonably large amount of angular misalignment while still transmitting towing and braking forces between the trailer 20 and the tractor 11. The kingpin 55 and the upper surface of the forward deck 54 are structurally interconnected by large longitudinal beams and smaller transverse beams.

Figure 9:
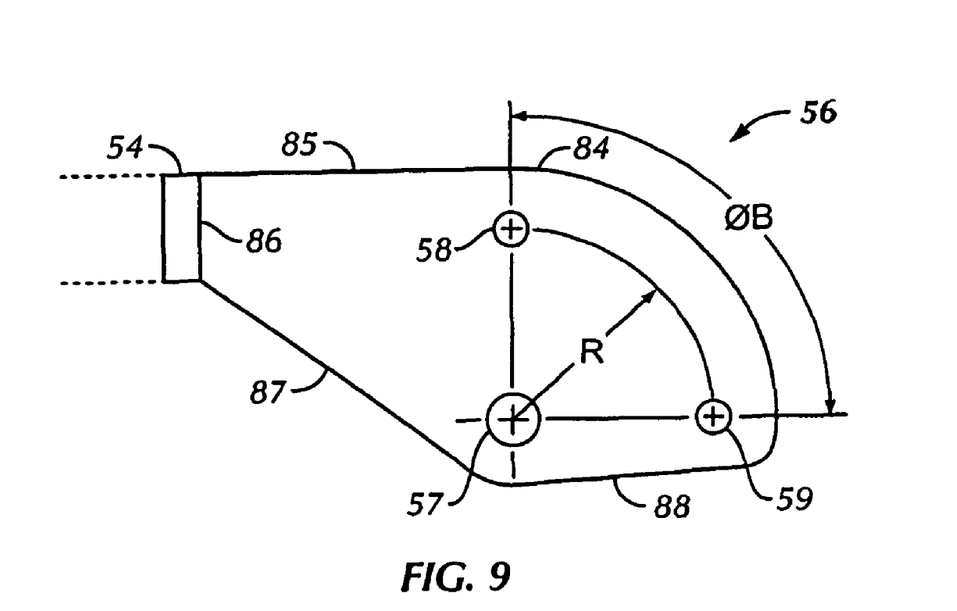
FIG. 9 is a detail side view of the forward pivot plate, wherein the angular relationships of the position locking pin holes are indicated.

Towards its rear end, the forward deck 54 is connected there to a pair of identical forward pivot plates 56. One forward pivot plate 56 is attached by lapping welding the pivot plate 56 onto each outboard side of the forward deck 54. As can be seen in FIGS. 4, 5, and 9, the forward pivot plates 56 extend to the rear and below the main portion of the forward deck 54.

The lateral positioning of the pivot plates 25, 30, and 56 relative to the longitudinal centerline of the trailer 20 is such that each forward pivot plate 56 of the forward deck 54 will have a loose slip fit between a rear outboard pivot plate 25 and a rear inboard pivot plate 30 of the central deck 21 when the two portions of the trailer are comated with their pivot holes 26, 31, and 57 placed in a coaxial position and the longitudinal centerlines of the forward deck 54 and the central deck 21 of the trailer aligned.

Referring to FIG. 9, the configuration of the forward pivot plates 56 is as follows moving counterclockwise from the lower rear corner of the plates. Edge 84 is an arcuate surface extending upwardly and a forward direction and covering an arc length of more than 90°. The upper end of the arcuate edge 84 is located vertically above the axis of the arcuate surface. Horizontal edge 85 is coplanar with the upper deck surface of the forward deck 54 and extends forward past the rear transverse end of the forward deck surface. Vertical edge 86 extends from the upper side to the lower side of the forward deck 54. First inclined edge 87 slopes downwardly in a rearward direction, where it intersects second inclined edge 88.

The second inclined edge 88 slopes slightly upwardly in the rearward direction until it intersects the arcuate edge 84. The intersection of the first 87 and second 88 inclined edges is radiused, as is the intersection of the second inclined edge 88 and the arcuate edge 84. Typically rectangular and triangular plate segments are used to form hollow triangular prismatic transitions between the vertical edges 86 of the two forward pivot plates 56 and the sides of the forward deck 54.

A large diameter pivot pin through hole 57 is aligned with the axis of the arcuate edge 84 of the forward pivot plates 56. The diameter of the pivot pin holes 57 in the forward pin plates is substantially the same as that of the pivot pin holes 26 and 31 of the rear outer 25 and rear inner 30 pivot plates.

Referring to FIG. 9, a first position locking pin hole 58 in the forward pivot plate 56 is located vertically at radius R above the pivot pin hole 57, and a second position locking pin hole 59 is located at radius R from the pivot pin hole 57 clockwise from position locking pin hole 58 by angle ΦB. The first 58 and second 59 position locking pin holes of the forward pivot plate 56 have about the same diameter as that of the position locking pin holes 27, 28 of the rear outer pivot plates 25 and the position locking pin holes 32, 33 of the rear inner pivot plates 30.

At assembly, the forward pivot plate 56 is positioned between the rear pivot plates 25 and 30 with the pivot pin holes 26, 31, and 57 coaxially aligned and normal to the longitudinal midplane of the trailer 20. Furthermore, the first position locking pin holes 25 and 32 of the rear pivot plates 25 and 30 are coaxially aligned with the first position locking pin hole 58 of the forward pivot plate 56, and the second position locking pin holes 28 and 33 of the rear pivot plates 25 and 30 are coaxially aligned with the second position locking pin hole 59 of the forward pivot plate 56.

Two pivot pins 36 and two position locking pins 38 are used to join the elements of the two altitude adjustment mechanisms 24 and thus the forward deck 54 to the central deck 21 of the trailer 20. The pivot pins 36 are headed on a first end and generally have a slight taper on the second end. The length of the right circular cylindrical central portion of the pivot pins 36 is sufficient to extend through and approximately one inch beyond each set of three interleaved pivot plates 25, 30, 56, and the diameter of the pivot pins 36 is such that they are a slip fit to the pivot pin holes 26, 31, and 57.

Typically, transverse diametrical keeper pins holes 40 are offset axially outwardly from the head of the pivot pins 36. The pivot pins 36 are stabbed through the coaxial pivot pin holes 26, 57, and 31 at assembly of the trailer 20 so that the transverse inner shoulders of the headed pivot pins 36 abut a rear outboard pivot plate surface. Headed elongated cylindrical pivot pin keepers 37 are inserted through the keeper pin holes 40 to retain the pivot pins 36 in place after assembly. Often headed bolts with lock nuts are used for this purpose.

Following the insertion of the pivot pins and their keepers 37, the central deck section 21 and the forward deck section 54 of the trailer 20 are hinged together on a horizontal axis transverse to the longitudinal midplane of the trailer.

The two position locking pins 38 are substantially similar to the pivot pins 36, with the exception that the diameter of the central cylindrical section of the position locking pins 38 is a slip fit both to the first position locking pin holes 27, 32, 58 and the second position locking pin holes 28, 33, 59 position locking pin holes. Position locking pin keepers 39, used for the position locking pins 38, are similar to the keeper pins 37 used with the pivot pins 36 with the exception that the keeper pins 39 are shorter, since the diameter of the position locking pins 38 is less than that of the pivot pins 36. The position locking pin keepers 39 are inserted into diametrical cross holes 41 in the exposed nonheaded ends of the position locking pins 38 to provide pin retention.

When the trailer has both its pivot pins 36 installed as described above and its position locking pins 38 installed in either the coaxial position locking pin holes 27, 32, 58 or the coaxial position locking pin holes 28, 33, 59, the trailer 20 has its central deck section 21 structurally attached in a rigid and safe load bearing configuration. Either of the two described configurations is structurally competent to transport a heavy trailer cargo 70 on both highways and unimproved roads.

OPERATION OF THE INVENTION

To complete assembly of the trailer 20, the position locking pins 38 with their position locking pin keepers 39 are installed in either the coaxial position locking pin holes 27, 32, and 58 or alternatively in the coaxial position locking pin holes 28, 33, and 59. For the purpose of example, it is assumed herein that the position locking pins are preinstalled in the coaxial first position locking pin holes 27 and 32 of the central deck portion 21 and the mutually coaxial first position locking pin holes 58 of the forward deck 54 portion of the trailer 20. The result is the first configuration of the trailer 20 shown in both FIGS. 1 and 2, with the jacks 44 fully retracted. This first configuration of the trailer 20 provides both an acceptable road clearance and a minimal practical load height for highway use.

Figure 3:
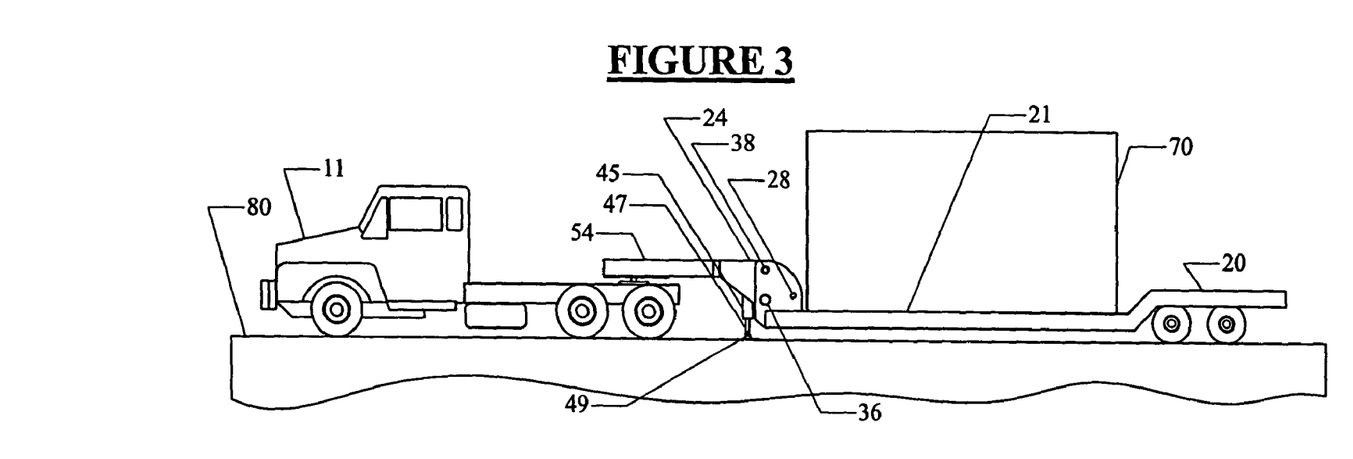
FIG. 3 corresponds to FIGS. 1 and 2, but shows the jacks located toward the forward deck of the trailer extended to contact the roadway surface.

In order to increase the road clearance for the trailer 20 from that shown in FIGS. 1 and 2, the first step is to extend the jacks 44 until they bear fully on the surface of the roadway, as is shown in FIG. 3. When the jacks 44 are then extended sufficiently further, the transverse loadings on the position locking pins 38 are reduced sufficiently to permit their extraction after the removal of the position locking pin keepers 39. Following extraction of the position locking pins 38, the jacks are extended still further until the second position locking pin holes 28, 33, and 59 are brought into axial alignment, as shown in FIG. 6.

Figure 6:
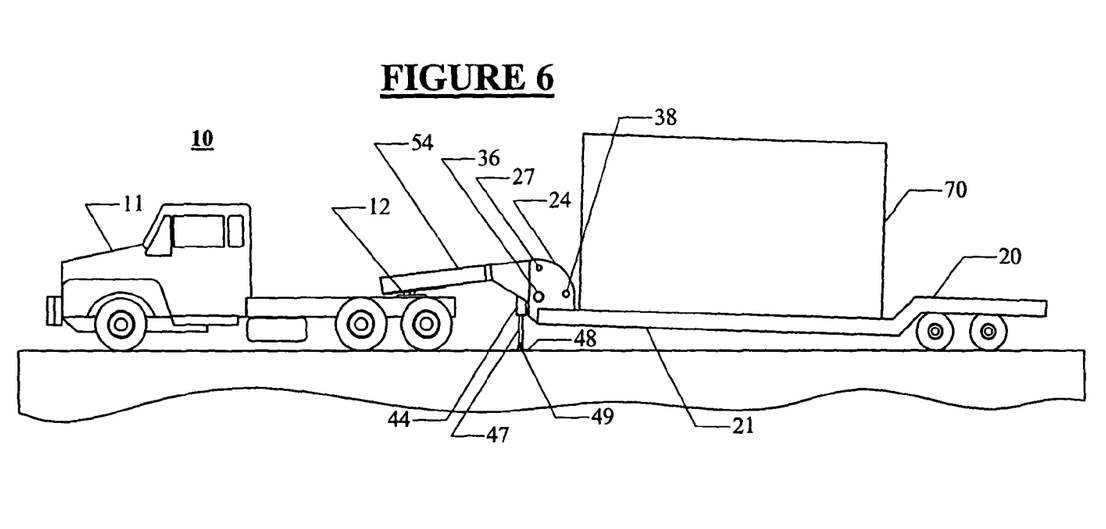
FIG. 6 corresponds to FIGS. 2 and 3, but with the position locking pins having been moved to engagement with a second set of locking pin holes after the jacks have elevated the forward deck of the trailer sufficiently in order to align the second set of locking pin holes.

The change of alignment from the first position shown in FIGS. 1 and 2 to that of FIG. 6 is effected by elevating both the forward deck of the central deck 21 and the rear portion of the forward deck 54, which are still pinned together by the pivot pins 36. At this point, the position locking pins 38 are then fully inserted into the now aligned and coaxial second position locking pin holes 28, 33, 59 and individually retained by their respective position locking pin keepers 39 engaged in the holes 41 of the locking pins 38. The position locking pins 38 are shown in their installed second position in FIG. 6.

Figure 7:
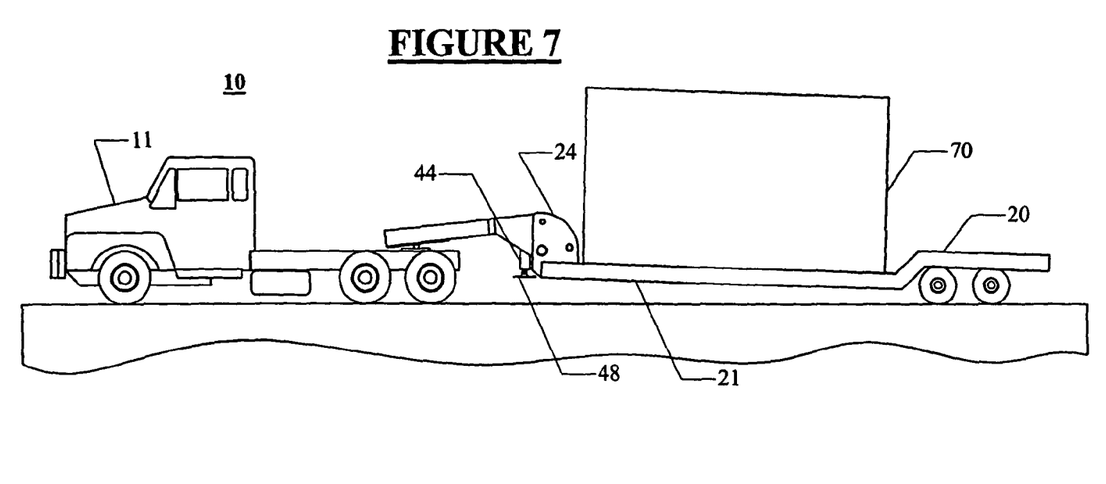
FIG. 7 corresponds to FIG. 6, but with the jacks retracted so the trailer can be moved without interference with the roadway.

To transition from the arrangement shown in FIG. 6 to the completed off-highway position shown in FIG. 7 all that is necessary is to fully retract the jacks 44 so that they do not extend below the bottom of the central deck 21 of the trailer 20. When the trailer is elevated as is shown in FIG. 7, the center portion of the length of the trailer 20 located between the fifth wheel 12 and the rear axles 52 is sufficiently elevated that it will clear high spots on most unimproved roads. The resulting improved road clearance allows the low boy trailer to be brought into and removed from the majority of most remote field locations.

Adjusting the trailer from the higher ground clearance configuration to the lower ground clearance configuration, the operator reverses the procedure for transitioning from the low ground clearance configuration of FIG. 2 to the improved ground clearance configuration of FIG. 7.

ADVANTAGES OF THE INVENTION

The provision of the selectably lockable articulated transverse axis joint intermediate to the length of the low boy trailer of the present invention readily permits adjusting the ground clearance of the trailer to handle different road conditions. The selectable locking of the altitude adjustment mechanism 24 is accomplished easily with the use of the position locking pins 38.

Fabrication costs for the altitude adjustment mechanism are low. The cost of the simple mechanical components is relatively low, and maintenance costs are minimal. The pinned connection is inherently robust while providing sufficient stiffness and strength to ensure long term reliability. Equipment inspection is quite simple.

Operator training is relatively simple and equipment inspection is basic. There are numerous advantages of being able to provide a practical maximum load height when operating on highways with vertical height limitations, while still being able to selectably and easily increase the road clearance of the critical central section of the trailer.

Although the present invention has been described in detail, it should be understood that various changes, substitutions and alterations can be made herein without departing from the spirit and scope of the invention as defined by the appended claims. As may be understood readily by those skilled in the art, certain variations in the structure of the present invention may be made without departing from the spirit of the invention. For instance, mechanical rather than hydraulic jacks could be used to raise and lower the trailer. The position locking pins could be made so that they can be withdrawn and engaged using screw threads to reciprocate the pins out of and into full engagement with the position locking pin holes. These and other minor changes can be made without departing from the spirit of the invention.

What is claimed is:

1. A vehicle trailer comprising:
    (a) a rear deck;
    (b) a forward deck having a second end;
    (c) a central deck having a front end and a rear end, wherein the rear end is attached to the rear deck to form a rigid unitary structure; and
    (d) a pair of pivotable altitude adjustment mechanisms connecting the front end of the central deck to the second end of the forward deck, wherein each altitude adjustment mechanism includes
        a first rear pivot plate having a pivot hole and a first position locking pin hole and a second position locking pin hole. the first rear pivot plate mounted on a corner of the front end of the central deck parallel to and offset a longitudinal midplane of the trailer,
        a second rear pivot plate having a pivot hole and a first position locking pin hole and a second position locking pin hole. the second rear pivot plate mounted on the front end of the central deck parallel to the first rear pivot plate and offset from the first rear pivot plate towards the longitudinal midplane of the trailer.
        a forward pivot plate having a pivot hole and a first position locking pin hole and a second position locking pin hole. the forward pivot plate mounted on the second end of the forward deck and positioned between the first and second rear pivot plates to coaxially align the pivot hole of the forward pivot plate with the pivot holes of the first and second rear pivot plates, and
        a pivot pin connecting the coaxially aligned pivot holes of the forward pivot plate and the first and second rear pivot plates;
    (e) an adjustment means for moving the front end of the central deck to an up position or a down position, wherein the up position coaxially aliens the first locking pins holes of the forward pivot plate and the first and second rear pivot plates and the down position coaxially aligns the second locking pins holes of the forward pivot plate and the first and second rear pivot plates; and
    (f) a selectable engageable position locking pin connecting coaxially aligned locking pin holes to lock the front end of the central deck in either the up position or the down position.

2. The vehicle trailer of claim 1, wherein the adjustment means include a pair of jacks vertically mounted to the altitude adjustment mechanism on the front end of the central deck.

3. The vehicle trailer of claim 2, wherein the jacks have a first end that is reciprocably extendable to move front end of the central deck to the up position or the down position.

4. A vehicle trailer comprising:
    (a) a rear deck;
    (b) a forward deck having a first end and a second end;
    (c) a central deck having a front end and a rear end, wherein the rear end is attached to the rear deck; and
    (d) a pair of pivotable altitude adjustment mechanisms connecting the front end of the central deck to the second end of the forward deck, wherein each altitude adjustment mechanism includes
        (i) a pair of rear pivot plates mounted on the front end of the central deck parallel to and offset from a longitudinal midplane of the trailer, wherein each rear pivot plate has a pivot hole and a first and a second position locking pin holes,
        (ii) a forward pivot plate mounted on the second end of the forward deck parallel to and offset from the longitudinal midplane of the trailer, wherein the forward pivot plate has a pivot hole and a first and second position locking pin hole, and
        (iii) a pivot pin connecting the pivot hole of the forward pivot plate to the pivot holes of the pair of rear pivot plates when the pivot holes of the forward pivot plate and the rear pivot plates are coaxially aligned; and
    (e) a jack fixedly mounted to each altitude adjustment mechanism perpendicular to the longitudinal midplane of the trailer, wherein each jack is selectably extendable for moving the front end of the central deck to an up position or a down position, wherein the up position coaxially aligns the first locking pins holes of the forward pivot plate and the first and second rear pivot plates and the down position coaxially aligns the second locking pins holes of the forward pivot plate and the first and second rear pivot plates; and (f) a selectably engageable position locking pin connecting coaxially aligned locking pin holes to lock the front end of the central deck in either the up position or the down position.

5. The vehicle trailer of claim 4, wherein the altitude adjustment mechanism has a single pivot point.

6. The vehicle trailer of claim 5, wherein the pivot point has an axis transverse to the longitudinal midplane of the vehicle trailer.

7. The vehicle trailer of claim 4, wherein the position locking pin is secured within the coaxially aligned position locking pin holes with a position locking keeper pin.

8. The vehicle trailer of claim 4, wherein the two altitude adjustment mechanisms are symmetrically mounted about the longitudinal midplane of the trailer.

9. A vehicle trailer comprising:
(a) a rear deck;
(b) a forward deck having a first end and a second end;
(c) a central deck having a front end and a rear end, wherein the rear end is attached to the rear deck to form a rigid unitary structure; and
(d) a pair of pivotable altitude adjustment mechanisms connecting the front end of the central deck to the second end of the forward deck, wherein each altitude adjustment mechanism includes
　(i) a first rear pivot plate having a first pivot hole and a first position locking pin hole located vertically at a radius R from the first pivot hole and a set distance from an arcuate edge of the first rear pivot plate and a second position locking pin hole located at an angle ΦA from the first position locking pin at about the radius R from first pivot hole and substantially the same distance from the arcuate edge of the first rear pivot plate as the first position locking pin hole, wherein a vertical edge of the first rear pivot plate is mounted on the front end of the central deck parallel to and offset from the longitudinal midplane of the trailer,
　(ii) a second rear pivot plate having a second pivot hole and a first position locking pin hole and a second position locking pin hole, wherein the second rear pivot plate is mounted on the front end of the central deck parallel to the first rear pivot plate and offset from the first rear pivot plate towards the longitudinal midplane of the trailer and wherein the first and second pivot holes are coaxially aligned and the first and second locking pin holes of the first and second rear pivot plates are coaxially aligned,
　(iii) a forward pivot plate mounted on the second end of the forward deck parallel to and offset from the longitudinal midplane of the trailer, wherein the forward pivot plate has a pivot hole and a first position locking pin hole and a second position locking pin hole, and
　(iv) a pivot pin connecting the pivot hole of the forward pivot plate to the pivot holes of the pair of rear pivot plates when the forward pivot plate is positioned between the first and second rear pivot plates and the pivot holes of the rear pivot plates are coaxially aligned with the pivot hole of the forward pivot plate, and
　(v) a selectably engageable position locking pin connecting one of two coaxially aligned position locking pin hole sets, wherein a first set of position locking pin holes includes the first position locking pin hole of the forward pivot plate and the first position locking pin hole in each rear pivot plate and a second set of position locking pin holes includes the second position locking pin hole of the forward pivot plate and the second position locking pin hole in each rear pivot plate, and
(e) a jack fixedly mounted to each altitude adjustment mechanism on the front end of the central deck. wherein a first end of each jack is selectably extendable to bear perpendicularly against a roadway to move the front end of the central deck to coaxially align the first set of position locking pin holes or the second set of position locking pin holes;
whereby each set of position locking pin holes is associated with a particular ground clearance for the front end of the central deck.

* * * * *